(12) United States Patent
Mueller et al.

(10) Patent No.: US 6,860,394 B1
(45) Date of Patent: Mar. 1, 2005

(54) CANDLE FILTER ELEMENT

(75) Inventors: Patrick Mueller, Staefa (CH); Ivo Schumacher, Jona (CH)

(73) Assignee: DRM, Dr. Mueller AG, Maennedorf (CH)

( * ) Notice: Subject to any disclaimer, the term of this patent is extended or adjusted under 35 U.S.C. 154(b) by 0 days.

(21) Appl. No.: 09/763,068

(22) PCT Filed: Sep. 13, 1999

(86) PCT No.: PCT/CH99/00426

§ 371 (c)(1), (2), (4) Date: Feb. 16, 2001

(87) PCT Pub. No.: WO00/16875

PCT Pub. Date: Mar. 30, 2000

(30) Foreign Application Priority Data

Sep. 21, 1998 (CH) ................................. 1924/98

(51) Int. Cl.[7] ............................................. B01D 29/11
(52) U.S. Cl. ....................... 210/458; 210/483; 210/489; 210/497.01
(58) Field of Search ............................ 210/356, 323.2, 210/333.01, 458, 497.01, 497.1, 489, 457, 483

(56) References Cited

U.S. PATENT DOCUMENTS

| | | | | |
|---|---|---|---|---|
| 3,326,382 A | * | 6/1967 | Bozek et al. | |
| 4,443,346 A | * | 4/1984 | Müller | ........................ 210/785 |
| 4,473,472 A | | 9/1984 | Mueller | |
| 4,604,201 A | * | 8/1986 | Müller | .................... 210/323.2 |
| 5,435,911 A | * | 7/1995 | Höhle | ......................... 210/136 |
| 6,041,944 A | * | 3/2000 | Meier | ......................... 210/356 |

FOREIGN PATENT DOCUMENTS

| EP | 0 066 921 A3 | 12/1982 | |
|---|---|---|---|
| WO | WO 97/04850 | * 2/1997 | ........... B01D/29/15 |

* cited by examiner

Primary Examiner—Robert James Popovics
(74) Attorney, Agent, or Firm—Michael J. Striker

(57) ABSTRACT

The multiple-tube filter proposed consists of at least one perforated filter element (15) whose outside surface has grooves (2) in a spiral round it, the surface between the grooves (2) preferably curving outwards in a circular arc.

6 Claims, 2 Drawing Sheets

CANDLE FILTER ELEMENT

Figure 1:
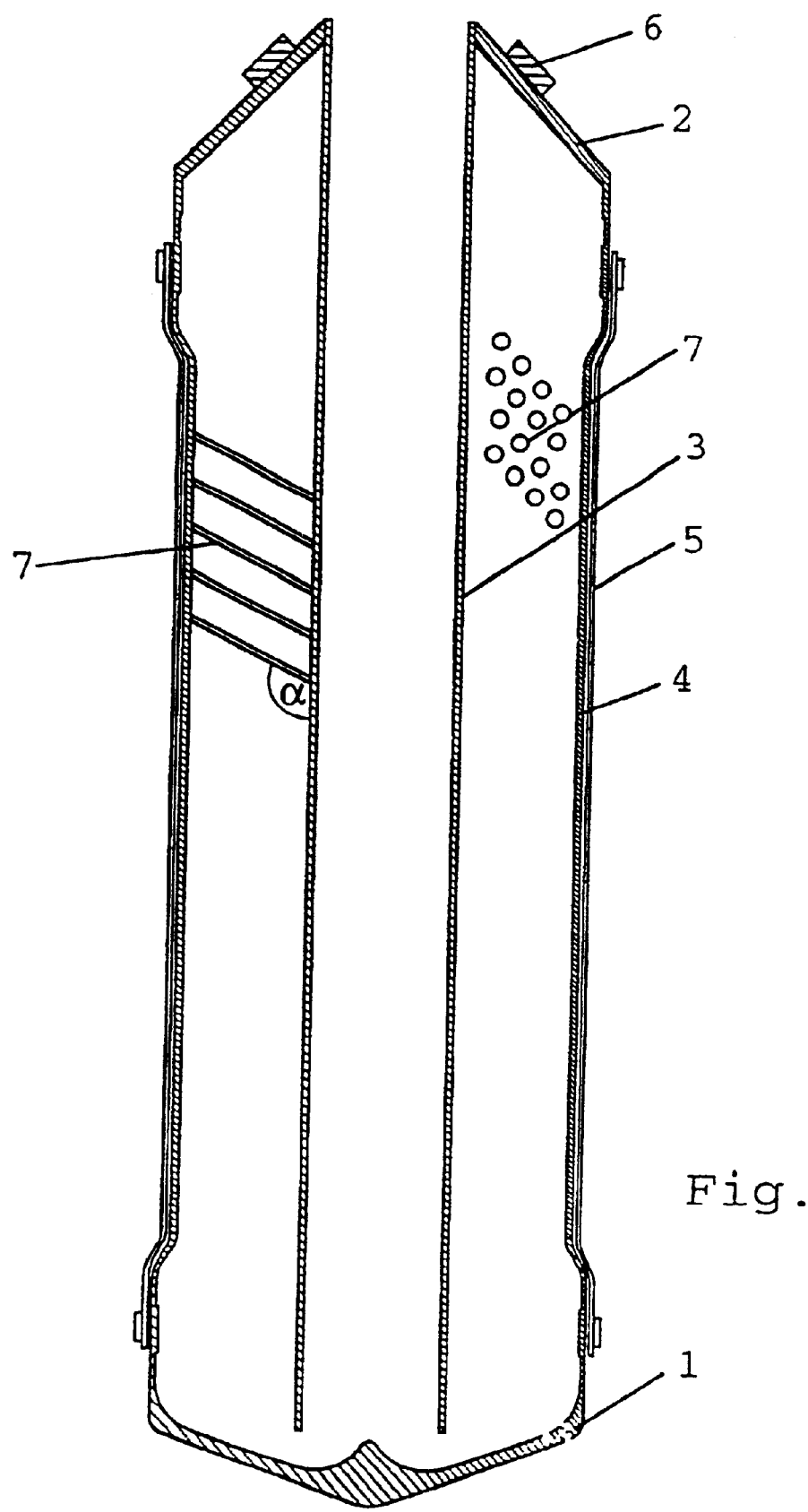

The invention relates to a candle filter element for assembly in a pressurized container, consisting of a support body disposed around a central tube with a closed surface, over which a filter cloth is stretched, wherein the support body is formed as a multi-lobed sheath element.

A candle filter element of this type is known from EP-A 0066921. The known filter element has support bodies in the form of a tube bundle. However, the use of tube bundles creates problems with regard to cleaning, especially before a change of product. Product residues in the interstices between the individual tubes are only partially, or not at all, removable. This applies particularly to filtration of food, pharmaceutical and biotechnological products where CIP (cleaning in place) or SIP (sterilization in place) is necessary.

The problem of the invention is to provide a filter element that is of simple and sturdy construction and extracts solids efficiently, yet ensures thorough cleaning.

In accordance with the invention this problem is solved by disposing the sheath element around the central tube and forming it in a series of semicircular curves. The support body now consists of an outer sheath, which is disposed around a central tube. This has the advantage that difficult-to-clean points of contact between individual support elements are eliminated. At the same time, a saving in material, and therefore weight, can be made, and the surface area to be cleaned can be reduced.

It is advisable to form the sheath element with at least two, and preferably at least three, lobes. With fewer than three curves in the sheath, the cleaning effect is not adequate.

It is convenient to join the sheath element to the central tube. The central tube can then be taken out together with the support body. This has the advantage that the candle filter element can be made pressure-proof. Taking out the central tube has the further advantage that the interstices can be exposed for cleaning.

It has been found particularly advantageous to form the curves in the sheath element as semicircles. The curved support body has the advantage that there are no corners or edges to damage the e.g. textile filter medium during filtration. The rounded shape of the support body extends the service life of the filter medium.

In one configuration the surface of the sheath element is provided with openings. These drainage openings may be round or angular, square, polygonal or oblong, or formed as slits.

Openings formed as slits have proved particularly advantageous. They should extend at an angle α of less than 120°, in particular between 60° and 120°, to the axis of the sheath element An angle of less than 60° has the drawback that the sturdiness of the sheath is no longer assured; and the same applies to angles of more than 180°. The most suitable material has been found to be stainless or special steel as used in the food and pharmaceutical industry.

The invention will now be described in detail with reference to a drawing, in which are shown schematically:

In FIG. 1, a longitudinal section through the candle filter element according to the invention.

Figure 2:
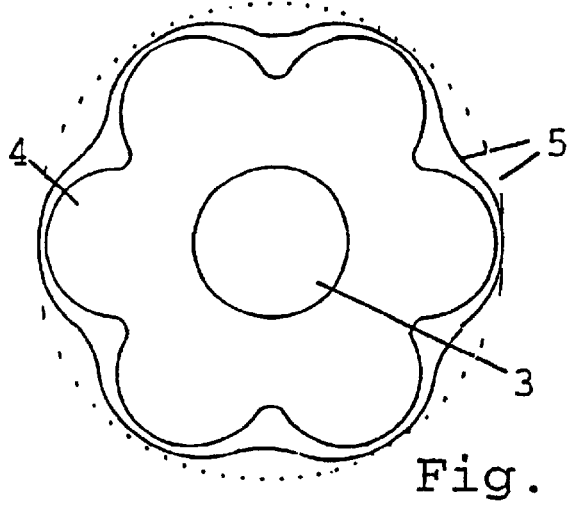

In FIG. 2, the candle filter element in cross-section.

Figure 3:
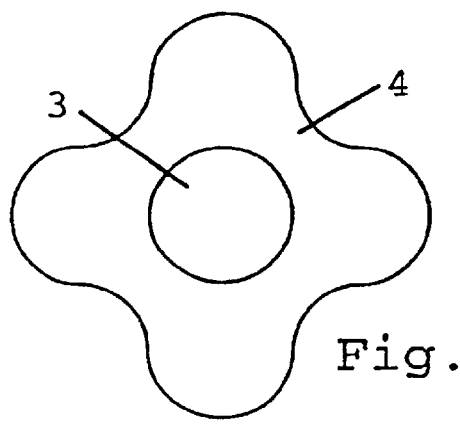

In FIG. 3, the cross-section of a four-lobed support body of the candle filter element.

Figure 4:
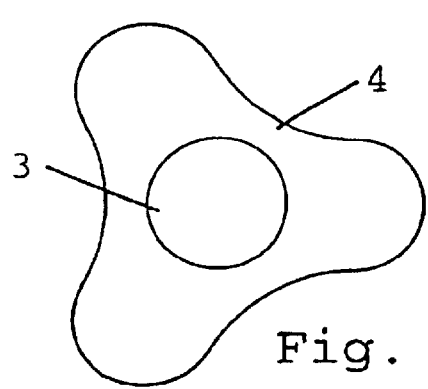

In FIG. 4, the cross-section of a three-lobed support body of the candle filter element.

Figure 5:
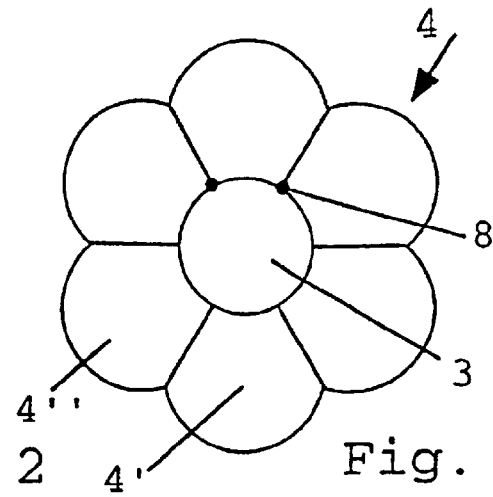

In FIG. 5, one variant of the six-lobed sheath element of the candle filter element, joined to the central tube.

Figure 6:
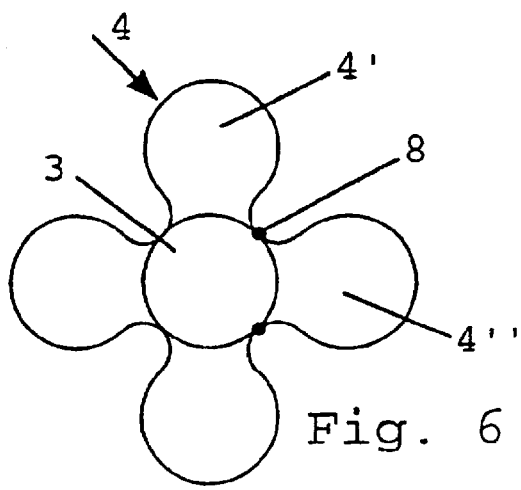

In FIG. 6, the cross-section of a four-lobed sheath element of the candle filter element, joined to the central tube.

Figure 7:
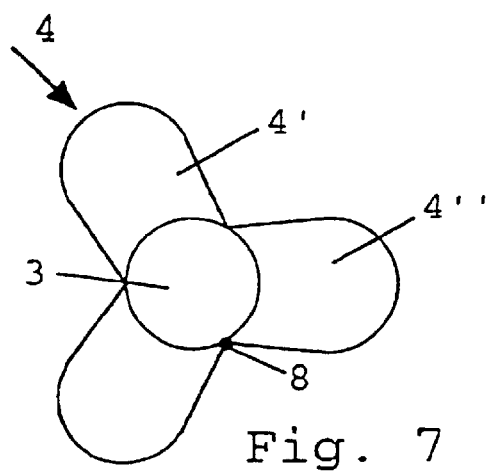

In FIG. 7, the cross-section of a three-lobed sheath element of the candle filter element, joined to the central tube.

In FIG. 1 a bottom end of the candle filter element carries the reference number 1. A sheath element 4, which is joined to a central tube 3, is arranged between the bottom end 1 and a head part 2. The central tube 3 has a closed surface over its entire length. A filter medium 5, preferably of woven cloth, is arranged over the sheath element 4. A coupling 6 for fixing the candle filter element inside a container (not shown) is provided in the head part 2. The sheath element 4 is partly provided with openings 7 appearing in the right-hand part of FIG. 1 as (by way of example) circular holes, and in the left-hand part of FIG. 1 as slits forming an angle a with the axis of the sheath element.

When in operation, the candle filter element is arranged in the container (not shown). Filtration takes place through the filter medium 5 from the outside inwards, through the openings 7 in the sheath element 4, with the clarified filtrate collecting between the sheath element 4 and the central tube 3. The filtrate enters the lower part of the central tube 3 and leaves the central tube 3 through its upper opening, passing into the filtrate chamber (not shown) of the filter container. The run-off of filtrate is substantially improved by the openings 7 in the sheath element 4.

FIG. 2 shows a six-lobed sheath element 4 mounted on the central tube 3 with the filter medium 5 in the filtration condition (unbroken line) and in the inflated condition during cleaning (dotted line). The filter medium 5 is stretched over the sheath element 4 so that it forms a wavy surface during filtration from the outside inwards and has a round cross-section during backwashing.

In FIGS. 3 and 4 the central tube 3 is provided with the sheath element 4 which has different lobe configurations.

In FIG. 5 the sheath element is composed of six individual sheath parts 4', 4", etc. The individual sheath parts 4', 4", etc. are attached to the central tube 3 at the points 8.

In FIGS. 6 and 7 the sheath parts 4', 4" are similarly attached to the central tube 3 at the points 8. The attachment may be made in a known manner, preferably by welding.

The provision of the sheath element 4 according to the invention in a candle filter has the advantage that a filter medium can be supported in a simple way and the filtrate can run off unhindered in the space between the central tube 3 and the filter medium 5.

What is claimed is:

1. A candle filter element for assembly in a pressurized container, the candle filter element comprising a support body disposed around a central tube and formed as a sheath element, so as to form a single hollow chamber between the central tube and said support body of the filter element and having a closed surface with openings, over which dosed surface a filter cloth is stretched, said support body having a central axis, said closed surface of said support body extending parallel to said axis and having a six-lobed shape with each lobe formed by a semi-circle.

2. A candle filter element as defined in claim 1, wherein said openings are formed as circles.

3. A candle filter element as defined in claim 1, wherein said openings are formed as slits.

4. A candle filter element as defined in claim 3, wherein said openings are formed as said slits forming an angle of less than 100° with an axis of said sheath element.

5. A candle filter for assembly in a pressurized container, comprising a central tube having an axis: and a candle filter support body disposed around a central tube and formed as a sheath element so as to form a single hollow chamber between the central tube and said support body of the filter element and having a closed surface with openings, over which cloth surface a filter cloth is stretched, said support body having a central axis coinciding with said axis of said central tube, said surface of said support body extending parallel to said axes and having a six-lobed shape with each lobe formed by a semi-circle.

6. A candle filter as defined in claim 5, wherein said removably arranged inside said sheath element.

* * * * *